(12) United States Patent
Zhuang

(10) Patent No.: US 12,121,113 B2
(45) Date of Patent: Oct. 22, 2024

(54) BUCKLE AND PET RESTRAINT DEVICE CONTAINING THE SAME

(71) Applicant: WENZHOU YUANFEI PET TOY PRODUCTS CO.,LTD., Wenzhou (CN)

(72) Inventor: Mingyun Zhuang, Wenzhou (CN)

(73) Assignee: WENZHOU YUANFEI PET TOY PRODUCTS CO., LTD., Wenzhou (CN)

( * ) Notice: Subject to any disclaimer, the term of this patent is extended or adjusted under 35 U.S.C. 154(b) by 84 days.

(21) Appl. No.: 18/076,438

(22) Filed: Dec. 7, 2022

(65) Prior Publication Data

US 2024/0164490 A1 May 23, 2024

(30) Foreign Application Priority Data

Nov. 18, 2022 (CN) ......................... 202211445488.X

(51) Int. Cl.
*A44B 11/25* (2006.01)
*A01K 27/00* (2006.01)

(52) U.S. Cl.
CPC ........ *A44B 11/2519* (2013.01); *A01K 27/002* (2013.01); *A44B 11/2546* (2013.01); *A01K 27/001* (2013.01); *A44B 11/2557* (2013.01)

(58) Field of Classification Search
CPC ............ A44B 11/2519; A44B 11/2546; A44B 11/2553; A44B 11/2557; A01K 27/002; A01K 27/001
See application file for complete search history.

(56) References Cited

U.S. PATENT DOCUMENTS

| | | | | |
|---|---|---|---|---|
| 5,465,472 | A * | 11/1995 | Matoba | A44B 11/266 24/616 |
| 8,561,577 | B1 | 10/2013 | Paxton et al. | |
| 10,051,921 | B2 | 8/2018 | Chun et al. | |
| 10,617,180 | B1 | 4/2020 | Yen | |
| 11,140,947 | B2 * | 10/2021 | Chen | A44B 11/266 |

(Continued)

FOREIGN PATENT DOCUMENTS

| CN | 209403287 U | 9/2019 |
|---|---|---|
| CN | 210299786 U | 4/2020 |

(Continued)

*Primary Examiner* — Robert Sandy
(74) *Attorney, Agent, or Firm* — Hemisphere Law, PLLC; Zhigang Ma

(57) ABSTRACT

A buckle and a pet restraint device, wherein the buckle includes a male buckle portion and a female buckle portion, wherein the male buckle portion has a first through hole and a second through hole through which the webbing passes, the female buckle portion has a third through hole through which the webbing passes, and the inner walls of the first through hole and the second through hole are spaced with a plurality of anti-skid ribs; anti-skid stripes are arranged around the first through hole and the second through hole. The buckle can effectively prevent the webbing on the buckle from lateral deflection or slipping, so that the webbing can always fit on the pet's body, avoiding safety problems caused by the looseness of the webbing or scratching of the pet's skin caused by the overturning of the webbing due to the lateral deflection.

11 Claims, 15 Drawing Sheets

(56) References Cited

U.S. PATENT DOCUMENTS

| | | | |
|---|---|---|---|
| 11,324,201 | B1 | 5/2022 | Benishai et al. |
| 11,388,959 | B2 | 7/2022 | Jing |
| 2009/0255484 | A1 | 10/2009 | Muelken |
| 2013/0092088 | A1 | 4/2013 | Sharp et al. |
| 2017/0021798 | A1 | 1/2017 | Sanchez Huipio et al. |
| 2022/0110419 | A1 | 4/2022 | Mojica |
| 2022/0295946 | A1 | 9/2022 | Cheng et al. |

FOREIGN PATENT DOCUMENTS

| | | |
|---|---|---|
| CN | 211672712 U | 10/2020 |
| CN | 216775807 U | 6/2022 |

\* cited by examiner

BUCKLE AND PET RESTRAINT DEVICE CONTAINING THE SAME

CROSS REFERENCE TO RELATED APPLICATIONS

This application claims the benefit of priority from Chinese Application No. 202211445488.X, filed Nov. 18, 2022, the entire contents of which are incorporated herein by reference.

BACKGROUND

The present invention relates to the field of pet supplies, and in particular to a buckle and pet restraint device.

With the improvement of people's living standards, more and more people begin to keep pets. Because most of these pets are grown indoors, they will regularly take outdoor exercise or activities with their guardians. Therefore, more and more products related to the facilitation of pets in outdoor activities have been derived, including various types of pet restraint devices. Most of the pet restraint devices will adopt buckle and adjustable webbing structure. The buckle structure is well-known, usually including male buckle portion and female buckle portion. The male buckle portion is equipped with a tongue which may be docked with the female buckle portion to realize the connection between male buckle portion and female buckle portion.

There are some defects when using these pet restraint devices. When people walk their pets outside, the webbing tied at both ends of the restraint device tends to deflect to one side or the webbing tend to be loosened, due to the uncertain movement direction and various body postures of pets. Under the above circumstances, the webbing and buckle are easy to wear and tear, resulting in short service life of the webbing or buckle. In addition, when the webbing tied at both ends of the buckle deflects laterally or slips, it will also cause safety problems. Moreover, when the webbing deflects laterally, the webbing will even turn over, causing scratches on the pet's skin, resulting discomfort to the pet. If the pet's hair is short, it will scratch and hurt the pet's skin.

SUMMARY

The present embodiments beneficially provides a buckle and a pet restraint device, to eliminate the deficiencies of the prior art, which beneficially blocks the occurrence, or at least reduces, such lateral deflecting or slippage of the webbing disposed thereon and thus the webbing may always be attached to the body of the pet.

In accordance with an embodiment of the invention, a buckle comprises a male buckle portion and a female buckle portion for docking with the male buckle portion, the male buckle portion having a first through hole and a second through hole thereon for webbing to pass therethrough, the female buckle portion having a third through hole for webbing to pass therethrough, wherein the male buckle portion is provided with a plurality of anti-skid edges thereon, which are spaced apart on an inner wall of the first through hole and the second through hole; the male buckle portion is provided with anti-skid stripes, which are distributed around an end of the first through hole and an end of the second through hole.

In particular, the buckle is an anti-skid buckle suitable for use in a pet restraint device.

In particular, the female buckle portion is also provided with a plurality of anti-skid edges, which are spaced apart on an inner wall of said third through hole; said female buckle portion is provided with anti-skid stripes, which are distributed around an end of said third through hole.

In particular, the extension direction of the anti-skid edges is consistent with the thickness direction of the buckle, and a gap exists between the anti-skid edges adjacent to each other.

In particular, the anti-skid edges include, along their extending direction, a first end, an anti-skid part, and a second end in turn; the thickness of said anti-skid edges gradually increases from said first end to said anti-skid part; and the thickness of said anti-skid edges decreases gradually from said anti-skid part to said second end.

In particular, said anti-skid stripes-strips include a plurality of wave-shaped slots spaced apart extending in a wave shape along the width direction of the buckle.

In particular, the male buckle portion further comprising:
a male buckle portion body, whereon the first through hole and the second through hole being provided with, one end of the male buckle portion body being provided with a mounting seat;
a first trigger and a second trigger, the first trigger and the second trigger being provided on both sides of the mount, the first trigger and the second trigger being both pivotally connected to the male buckle portion body, the first trigger and the second trigger being provided with a first convex block and a pressing portion thereon;
a resilient member, which is coupled to said mount, said resilient member suitable for urging said first trigger and said second trigger to rotate outwardly;
one end of the female buckle portion is provided with a cavity, one side of the female buckle portion is provided with a first through hole in communication with the cavity, the other side of the female pressing portion is provided with a second through hole in communication with the cavity, the first trigger and the second trigger may be simultaneously inserted into the cavity, the pressing portion on the first trigger may extend through the first through hole to the outside of the female buckle portion, the pressing portion on the second trigger may extend through the second through hole to the outside of the female buckle portion, the cavity is provided with a stop block, where the stop block and the first convex block fasten to each other, and the stop block may be separated from the first convex block when the pressing portion is pressed inward.

In particular, the resilient member is a torsion spring, where a coil of the torsion spring pivotally connected to the mounting seat, and two outer arms of the torsion spring abutting the first trigger and the second trigger respectively.

In particular, the mounting seat includes a first guide part and a second guide part, where the first guide part and the second guide part are insertable into said cavity, a spring ring of the torsion spring is disposed between the first guide part and said second guide part, said spring ring of said torsion spring is provided with a pin shaft that is fixedly coupled to said first guide part and/or said second guide part.

In particular, the first guide part is provided with a guide slot in a surface perpendicular to the buckle thickness direction, the guide slot extends in a direction consistent with the direction of buckle penetration, the cavity is provided with a guide block fixedly attached to the female buckle portion, and the guide block is insertable into the guide slot.

In particular, one end of the female buckle portion is provided with a notch, on which a stop block is provided, where the stop block is insertable into the notch.

In accordance with another embodiment of the invention, provides a pet restraint device that includes a webbing and the buckle as described above.

Compared to the prior art, when the present buckle is applied to a prior pet restraint device, the webbing will always remain in contact with the anti-skid edges and the anti-skid stripes on the buckle, regardless of which direction the pet is moving or in which body postures, that is, the anti-skid edges and the anti-skid stripes may collaboratively prevent the deflection or slippage of the bundled webbing on the buckle, thus to keep the webbing always in contact with the body of the pet, which avoid the safety problem due to a loosened webbing and pet skin scratch issue due to lateral turn-over of the webbing.

These and other features and advantages of the present invention will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein.

The reference numerals are illustrated as follows.

Figure 1:
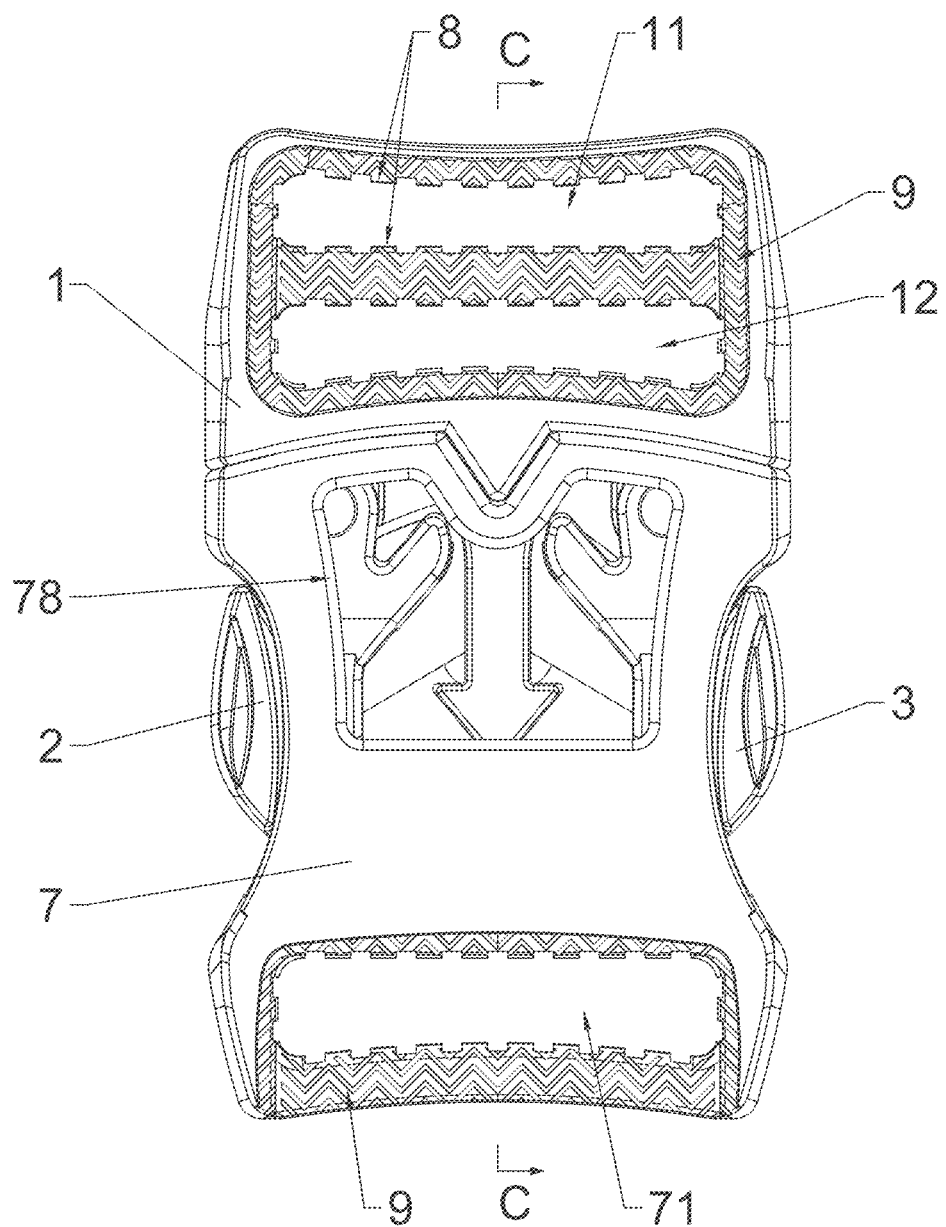
FIG. 1 is a front view depicting an exemplary embodiment of the present invention.

100-male buckle portion, 1-male buckle portion body; 11-first through hole; 12-second through hole; 13-mounting seat; 131-first guide part; 1311-guide slot; 132-second guide part; 14-first hinge; 15-second hinge; 16-pin hole; 17-second convex block; 18-stop block; 2-first trigger; 21-first convex block; 22-pressing portion; 23-accommodation slot; 24-range limiting slot; 25-shielding part; 3-second trigger; 4-resilient member; 41-coil of spring; 42-outer arm; 5-pin; 6-pivot; 7-female buckle portion; 71-third through hole; 72-cavity; 73-first through hole; 74-second through hole; 75-stopping block; 76-guiding block; 77-notch; 78-third through hole, 79-the fourth through hole; 710-the fifth through hole; 8-anti-skid edge; 81-first end, 82-anti-skid part, 83-second end; 9-anti-skid stripes strap; 91-wave-shape slot; 10-webbing; 10a-first webbing; 10b-second webbing.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Various aspects of the disclosure are further detailed below.

Unless defined otherwise, all technical and scientific terms used herein have the same meaning as commonly understood by one of ordinary skill in the art. Moreover, any method and material similar or equivalent to those described may be used in the present disclosure. The terms are described as below.

Unless defined otherwise, "or" as used herein includes a relationship of "and". The "sum" corresponds to a Boolean logic operator "AND," which corresponds to a Boolean logic operator "OR," and "AND" is a subset of "OR".

The terminology used herein is for the purpose of describing particular embodiments only and is not intended to be limiting of the present disclosure. As used herein, the singular forms "a," "an," and "the" may include the plural forms as well, unless the context clearly indicates otherwise. Further, the terms "comprises" and/or "comprising," when used in this specification, specify the presence of stated features, steps, operations, elements, and/or components, but do not preclude the presence or addition of one or more other features, steps, operations, elements, components, and/or groups thereof. Terms such as "above," "below," "above," and "below" are used to indicate relative positional relationships between elements or structures, rather than absolute positions.

In the present pet traction ropes, the following are several common scenarios leading to new problems, as well as the processing scheme of the corresponding resolution measures taken to address the new problem:

for example, Chinese utility No. CN209403287U, CN216775807 and U.S. Pat. Nos. 8,561,577B1 and 11,324,201B1, disclose use of buckles in both restraint devices.

These restraint devices, however, are not capable of addressing the problems set forth in the present disclosure, that is, in the course of use, there are some drawbacks in the process of use, when people go out of walking a pet, as the direction of motion of the pet is uncertain, body posture is also unpredictable, it is easy to assume that the binding of the bundled webbing at both ends of the restraint device is deflected toward one side or from the webbing, in which case the webbing and buckle are prone to wear, resulting in a shorter service life of the webbing or buckle; when the bundled webbing at both ends of the buckle laterally deflect or slip, a safety issue may also be caused; and when the webbing is laterally deflected, the webbing may even flip, causing the pet's skin to be scratched, thus causing discomfort to the pet, and also scratching the pet's skin if the pet's hair is relatively short.

While the present embodiments employs a specific anti-skid system, where the provided buckle is applied to the pet restraint device in the prior art, the webbing will always remain in contact with the anti-skid edges 8 and the anti-skid strips stripes 9 on the buckle, regardless of which direction the pet is moving or in which body position or posture, the anti-skid edges 8 and the anti-skid stripes strips 9 collaboratively prevent the deflection or slippage of the bundled webbing on the buckle, keep the webbing always against the body of the pet, avoid a safety issue due to the webbing loosening, which may cause the pet's skin to become scratched due to the webbing lateral turn-over, thus rendering the pet to have a better wear experience, and preventing scratching the skin of the pet.

It should be understood that the disclosed anti-skid structure may also be applied to other pet restraint devices, not limited to chest stripes or pet traction ropes.

The implementations of the present disclosure are illustrated below through specific examples, and other advantages and effects of the present disclosure can be easily understood by those skilled in the art through the contents disclosed in the description of the present disclosure. Apparently, the described embodiments are only a part but not all of the embodiments of the present disclosure. The present disclosure can also be implemented or applied by further different specific implementations. Moreover, various modifications or changes may be made to all details in this description based on different viewpoints and applications without departing from the spirit of the present disclosure. It should be noted that the following embodiments and features therein may be combined with each other without conflict. All other embodiments obtained by a person of ordinary skill in the art based on the embodiments of the present disclosure without creative efforts shall fall within the protection scope of the present disclosure.

The implementations of the present disclosure are illustrated below through specific examples, and other advantages and effects of the present disclosure can be easily understood by those skilled in the art through the contents disclosed in the description of the present disclosure. Apparently, the described embodiments are only a part but not all of the embodiments of the present disclosure. The present disclosure can also be implemented or applied by further different specific implementations. Moreover, various modifications or changes may be made to all details in this description based on different viewpoints and applications without departing from the spirit of the present disclosure. It should be noted that the following embodiments and features therein may be combined with each other without conflict. All other embodiments obtained by a person of ordinary skill in the art based on the embodiments of the present disclosure without creative efforts shall fall within the protection scope of the present disclosure.

It should be noted that the diagrams provided in the following embodiments merely schematically illustrate the basic concept of the present disclosure, and only the components related to the present disclosure are shown in the diagrams, so that the diagrams are not drawn in accordance with the number, shape and size of the components in actual implementations. The type, the number and the proportion of the components in the actual implementations can be arbitrarily changed, and layouts of the components may be more complicated.

In addition, in the following description, specific details are provided to facilitate thorough understanding of the examples. However, it will be understood by those skilled in the art that the described aspects may be practiced without these specific details.

EXAMPLE 1

Figure 2:
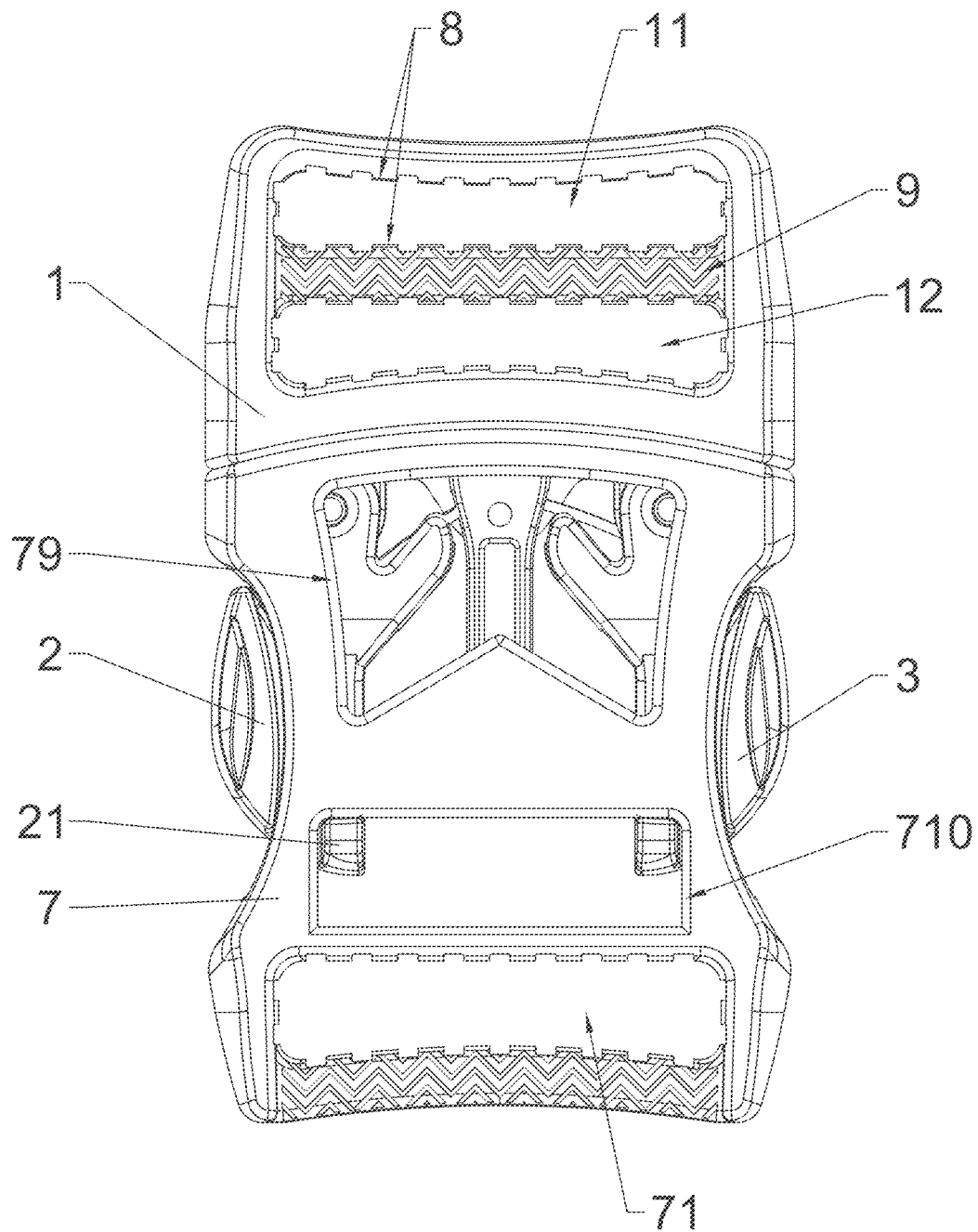
FIG. 2 is a rear view depicting an exemplary embodiment of the present invention.
Figure 11:
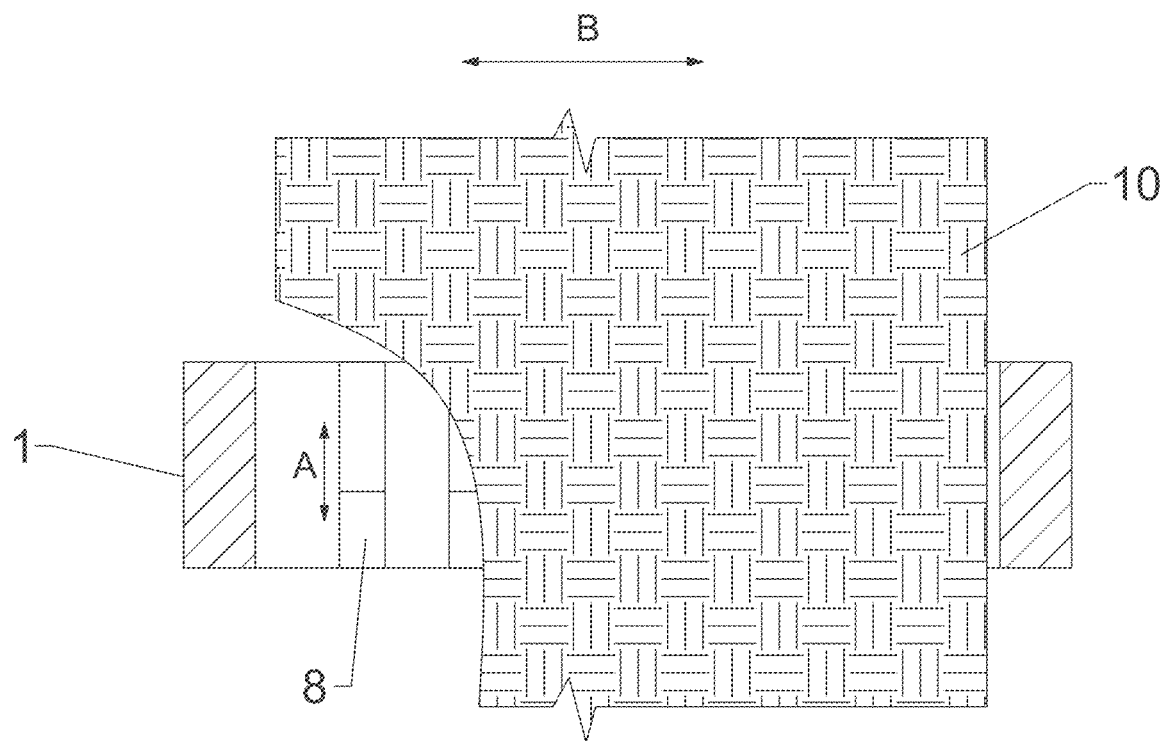
FIG. 11 is a schematic view of a webbing through the first through hole.
Figure 12:
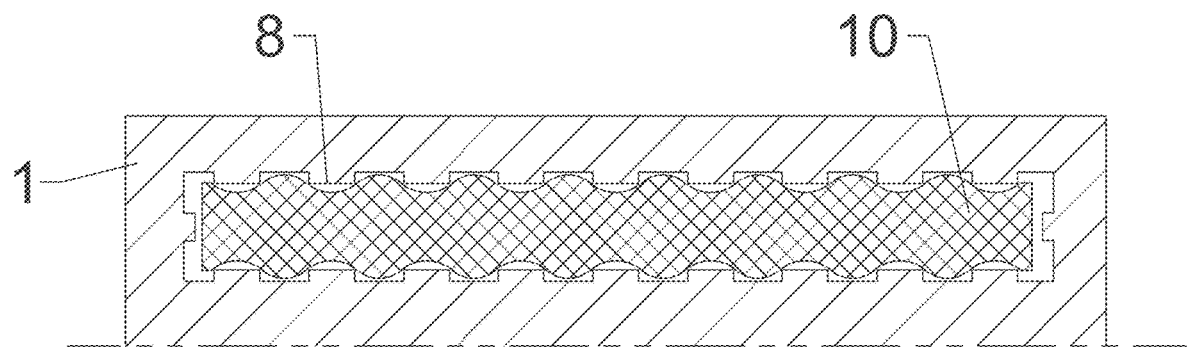
FIG. 12 is a schematic view of another webbing penetrating the first through hole, the cross-sectional orientation of the present diagram being perpendicular to the dissecting direction of FIG. 11.
Figure 13:
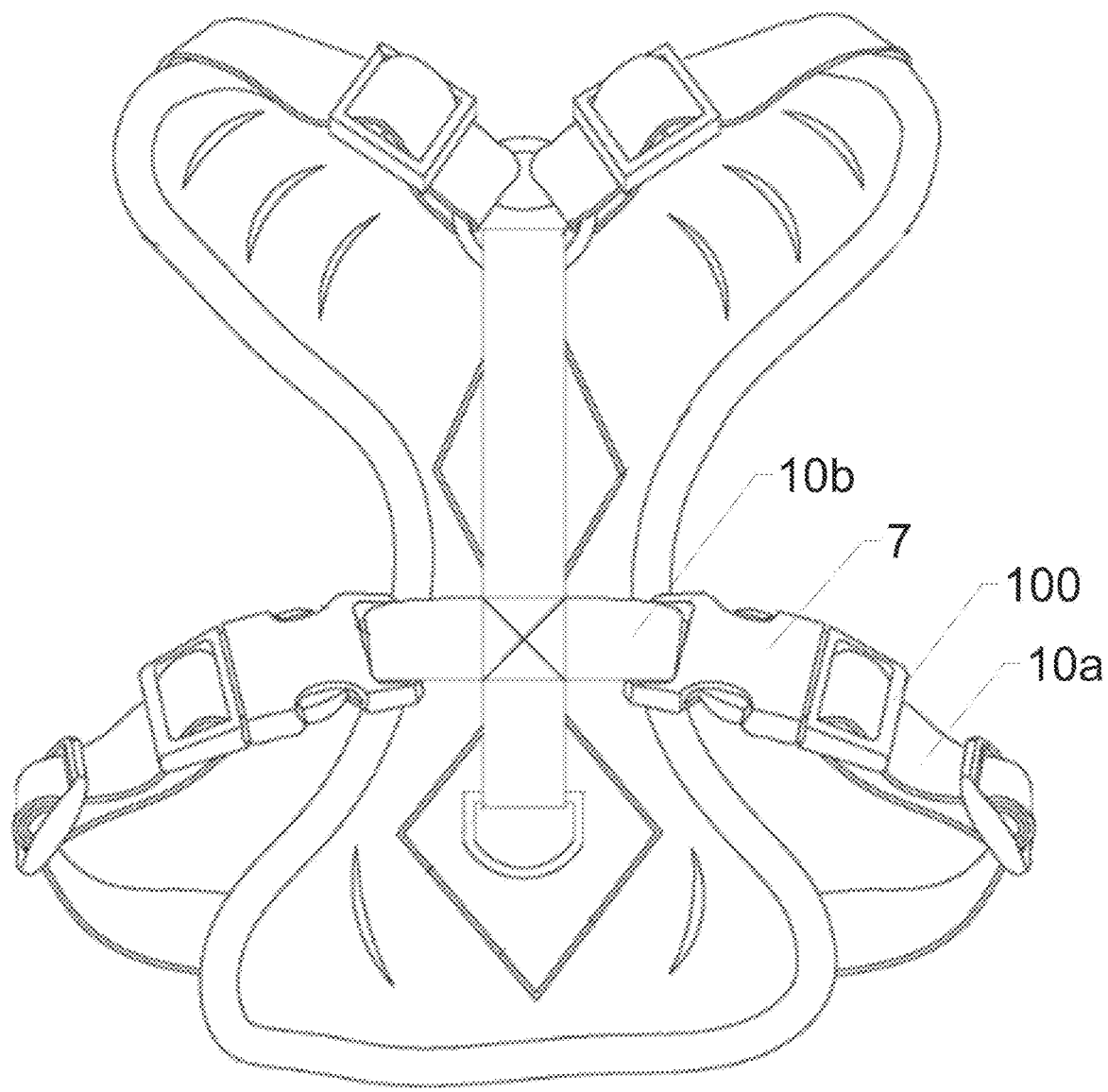
FIG. 13 is a traction structure of a prior art.

As shown in FIGS. 1-12, the present embodiments provides a buckle including a male buckle portion 100, and a female buckle portion 7 for docking with the male buckle portion 100. The male buckle portion have a first through hole 11 and a second through hole 12 thereon for webbing 10 to pass therethrough, the female buckle portion having a third through hole 71 for webbing 10 to pass therethrough, wherein, the male buckle portion 100 is provided with a plurality of anti-skid edges 8 thereon, which are spaced apart on an inner wall of the first through hole 11 and the second through hole 12; the male buckle portion 100 is provided with anti-skid stripes 9, which are distributed around an end of the first through hole 11 and an end of the second through hole 12. As shown in FIGS. 1 and 2, the first through hole 11, the second through hole 12, and the third through hole 71 are long strips respectively, the length of the first through hole 11, the second through hole 12, and the third through hole 71 are adapted to conform to the width of the webbing 10, and the width of the first through hole 11, the second through hole 12, and the third through hole 71 are adapted to conform to the thickness of the webbing 10. As shown in FIG. 13, the first webbing 10*a* passes through the first through hole 11 and the second through hole 12 in turn, the first webbing 10*a* may be adjusted to change the size of the pet restraint device (such as a chest strap), thus the rope may be adapted to accommodate different sizes of pet, and the second webbing 10*b* is looped through the third through hole 71 on the female buckle portion 7.

Compared to the prior art, when the present buckle is applied to a prior pet restraint device, the webbing 10 will always remain in contact with the anti-skid edges 8 and the anti-skid stripes 9 on the male buckle portion 100, regardless of which direction the pet is moving or in which body postures, that is, the anti-skid edges and the anti-skid stripes collaboratively prevent the deflect or slippage of the bundled webbing on the buckle, thus to keep the webbing always in contact with the body of the pet, which avoid the safety problem due to loosened webbing and pet skin scratch issue due to lateral turn-over of the webbing. In addition, the present buckle can prevent the webbing 10 and buckle from wearing, to render webbing 10 and buckle a longer service life.

To further prevent lateral deflecting of the bound webbing 10 on the female buckle portion 7, a plurality of anti-skid edges 8 may be provided on the female buckle portion 7, a plurality of anti-skid edges 8 on the female buckle portion 7 are spaced apart on an inner wall of the third through hole 71, a surface of the female buckle portion 7 is provided with a anti-skid stripes 9, and anti-skid stripes 9 on the female buckle portion 7 are distributed around the end of the third through hole 71. The positions of the anti-skid edges 8 and the anti-skid stripes 9 on the female buckle portion 7 may be seen in FIGS. 1 and 2.

Figure 3:
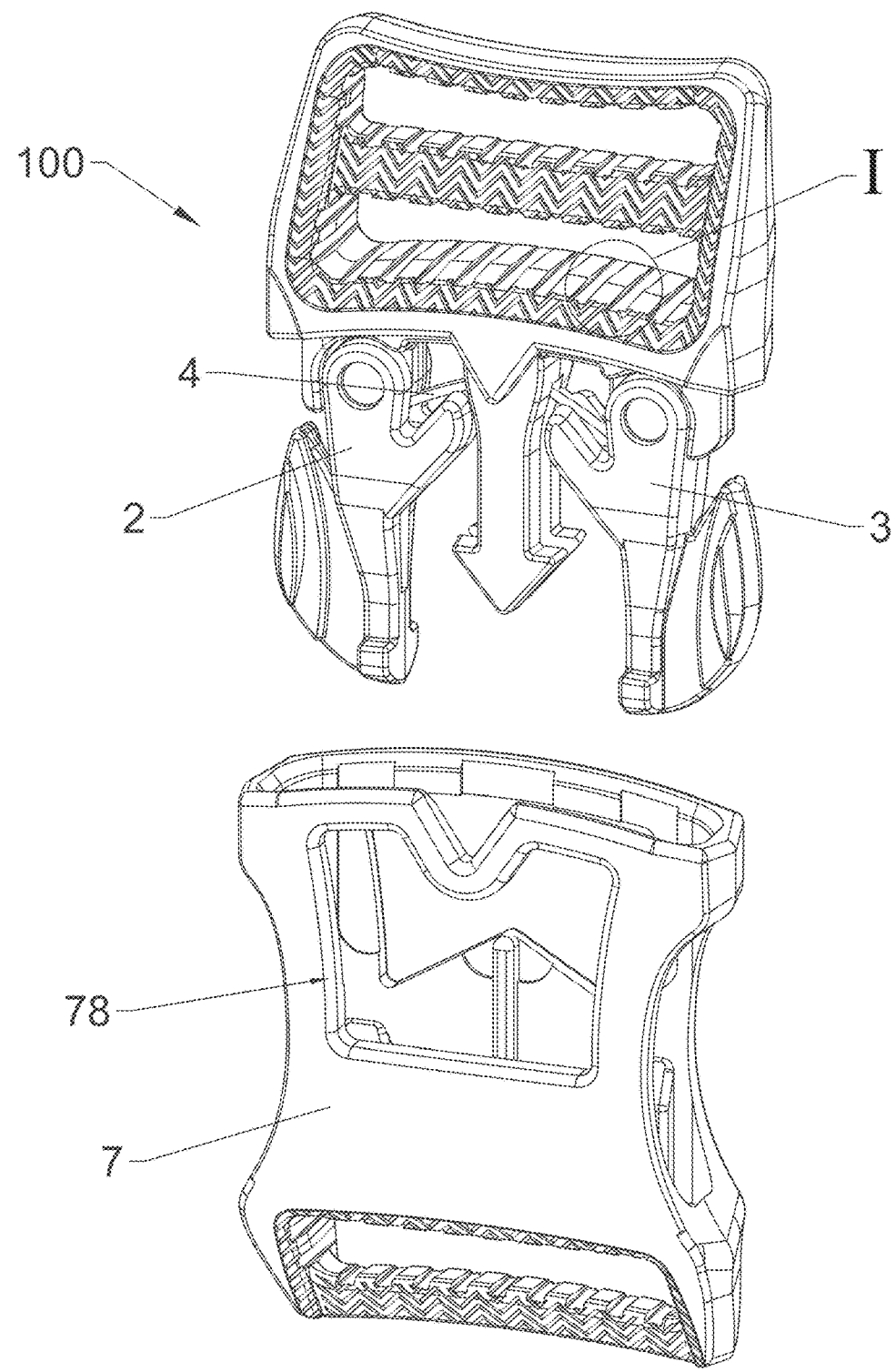
FIG. 3 is a schematic view depicting a male buckle portion and a female buckle portion according to an exemplary embodiment of the present invention.
Figure 9:
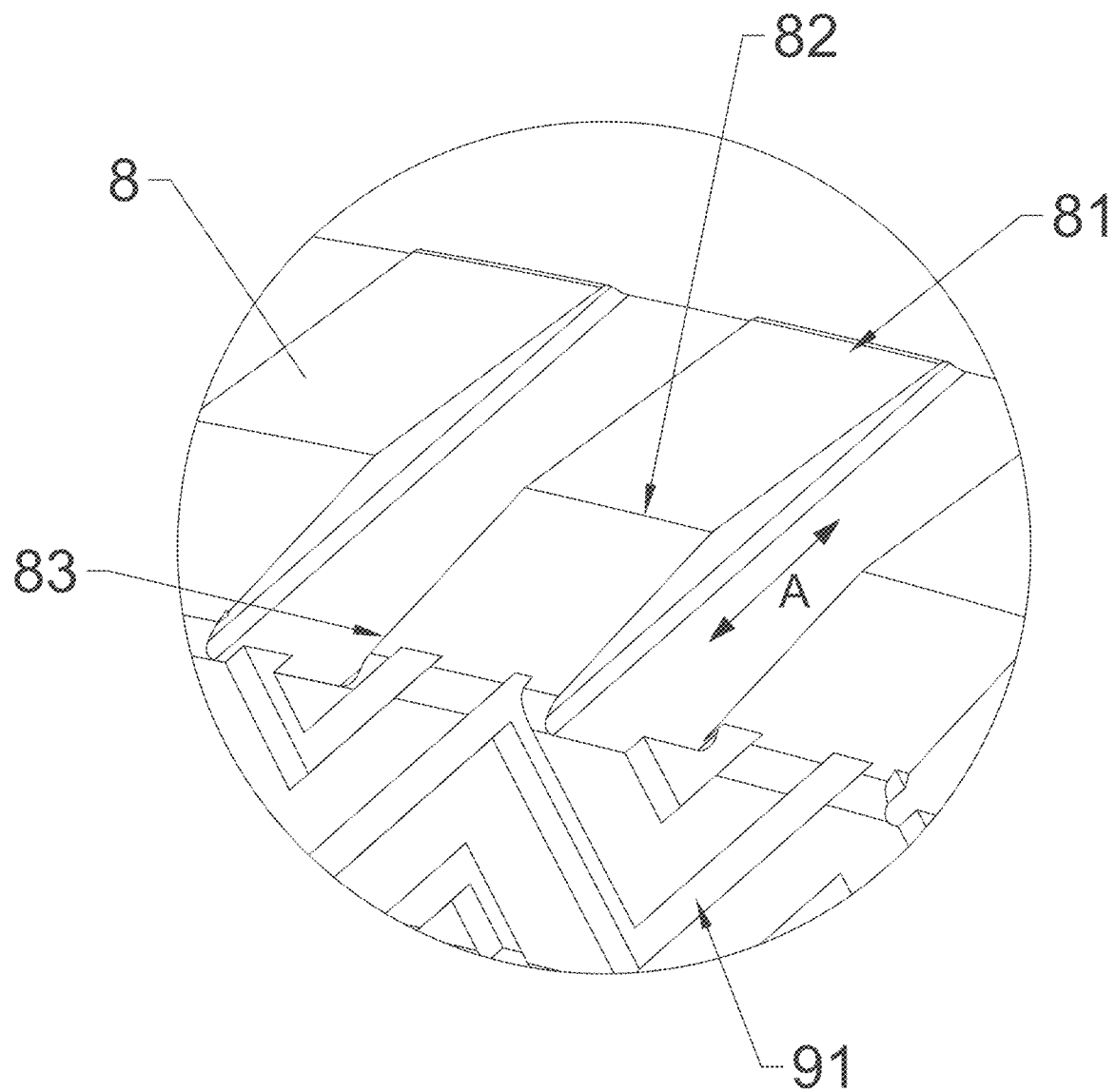
FIG. 9 is an enlarged partial view at I of FIG. 3.

In order to further prevent lateral deflecting of the webbing 10 bound on the male buckle portion 100 and the female buckle portion 7, when designing the structure of anti-skid edges 8, the extending direction of the anti-skid edges 8 is adapted to have a certain angle with the width direction of the buckle. The angle between the extending direction of the anti-skid edge 8 and the width direction of the buckle is in the range of 0 to 90 degrees, and the anti-skid effect is more pronounced as the numerical value increases. FIG. 9 is an enlarged partial view at I in FIG. 3, FIG. 11 shows a schematic view of the webbing 10 as it passes through the first through hole 11, the direction indicated by arrow A in FIG. 11 is the direction of extension of the anti-skid edges 8, and the direction indicated by arrow B in FIG. 11 is the width direction of the buckle.

Preferably, the direction of extension of the anti-skid edges 8 is consistent with the thickness direction of the buckle, i.e., the angle between the extending direction of the anti-skid edges 8 and the width direction of the buckle is 90 degrees, and there is a gap between the anti-skid edges 8 adjacent to each other. The cross sectional structure of some of the webbing 10 in the prior art is shown in FIG. 12, and the upper and lower surfaces of the webbing 10 each have protrusions and recesses, and the contour lines of the upper and lower surfaces of the webbing 10 are wavy lines. As shown in FIG. 12, when the aforementioned webbing 10 is used in conjunction with the buckle of the present embodiment, the protrusion on the webbing 10 is between the two anti-skid edges 8, and the anti-skid edges 8 is within the recess on the webbing 10, as can be readily seen in FIG. 12, the anti-skid edges 8 may effectively prevent this type of webbing 10 from sliding along the width direction of the buckle. Also, during use, because the direction of extension of the anti-skid edge 8 coincides with the length direction of the webbing 10, the resistance to which the webbing 10 is subjected when installing or adjusting the webbing 10 is small, facilitating installation and adjustment of the webbing 10, as well as preventing excessive wear of the webbing 10.

Figure 10:
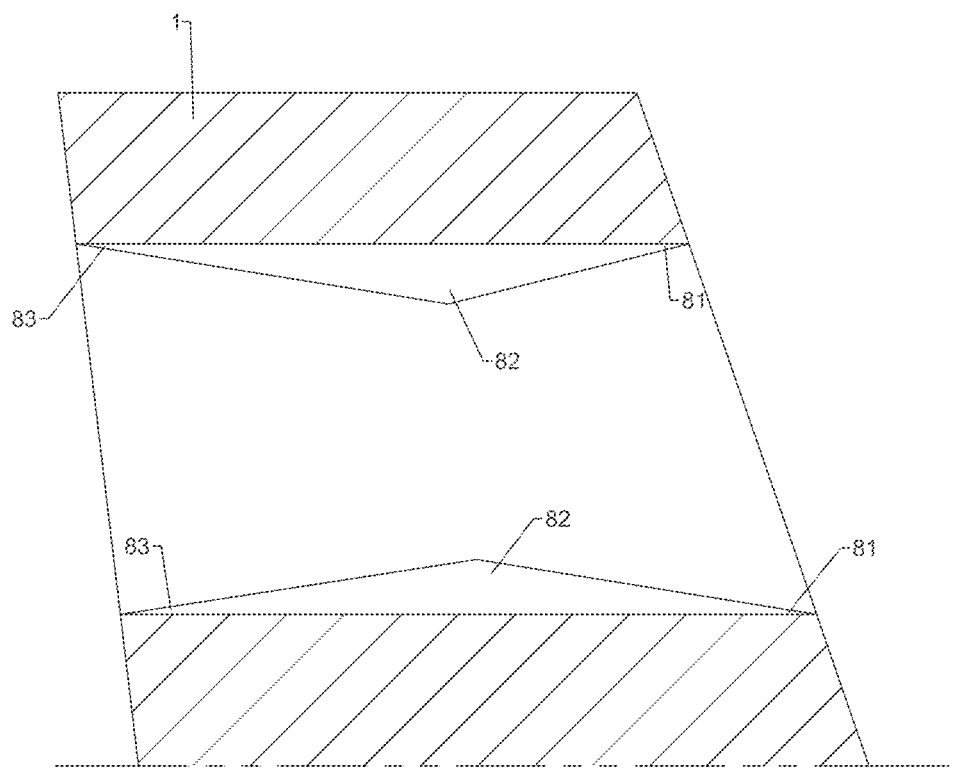
FIG. 10 is a partial cross-sectional view of the first perforated hole with a cutaway position see C-C line in FIG. 1.

To facilitate penetration of the webbing 10, further optimization of the structure of the anti-skid edges 8 may be made. Referring to FIG. 9, in the direction of elongation of the anti-skid edges 8, the anti-skid edges 8 includes, in order, a first end 81, a anti-skid edges 82, and a second end 83; the thickness of the anti-skid edges 8 gradually increases from the first end 81 to the anti-skid edges 82; and the thickness of the anti-skid edges 8 decreases gradually from the anti-skid edges 82 to the second end 83. FIG. 10 is a schematic view of the cross section of the first through belt hole 11, further showing two anti-skid edges 8 in the first through belt hole 11, wherein the spacing between the anti-skid portion 82 of the upper anti-skid edge 8 and the anti-skid portion 82 of the underlying anti-skid edge 8 is minimal, the spacing between the anti-skid edge 8 and the underlying anti-skid edge 8 from the anti-skid portion 82 to the first end 81 or the second end 83 of the anti-skid edge 8 is gradually increased, such a structural design facilitates insertion of the webbing 10 between the upper and lower non-skid edges 8, and the pet is in contact with the anti-skid portion 82 when the pet is active, and the webbing 10 is prevented from deflecting by the anti-skid portion 82.

In the preferred embodiment, the anti-skid stripes 9 includes a plurality of spaced apart wave slots 91 that extend in an undulating direction along the width direction of the buckle. The webbing 10 used in the present embodiments is a narrow web made of a variety of yarns, the surface of the webbing 10 being of a roughened structure, the set anti-skid stripes 9 increasing the surface roughness of the portion of the buckle in contact with the webbing 10, so that the webbing 10 may be more effectively prevented from being offset from one side of the buckle when the pet is active.

Figure 6:
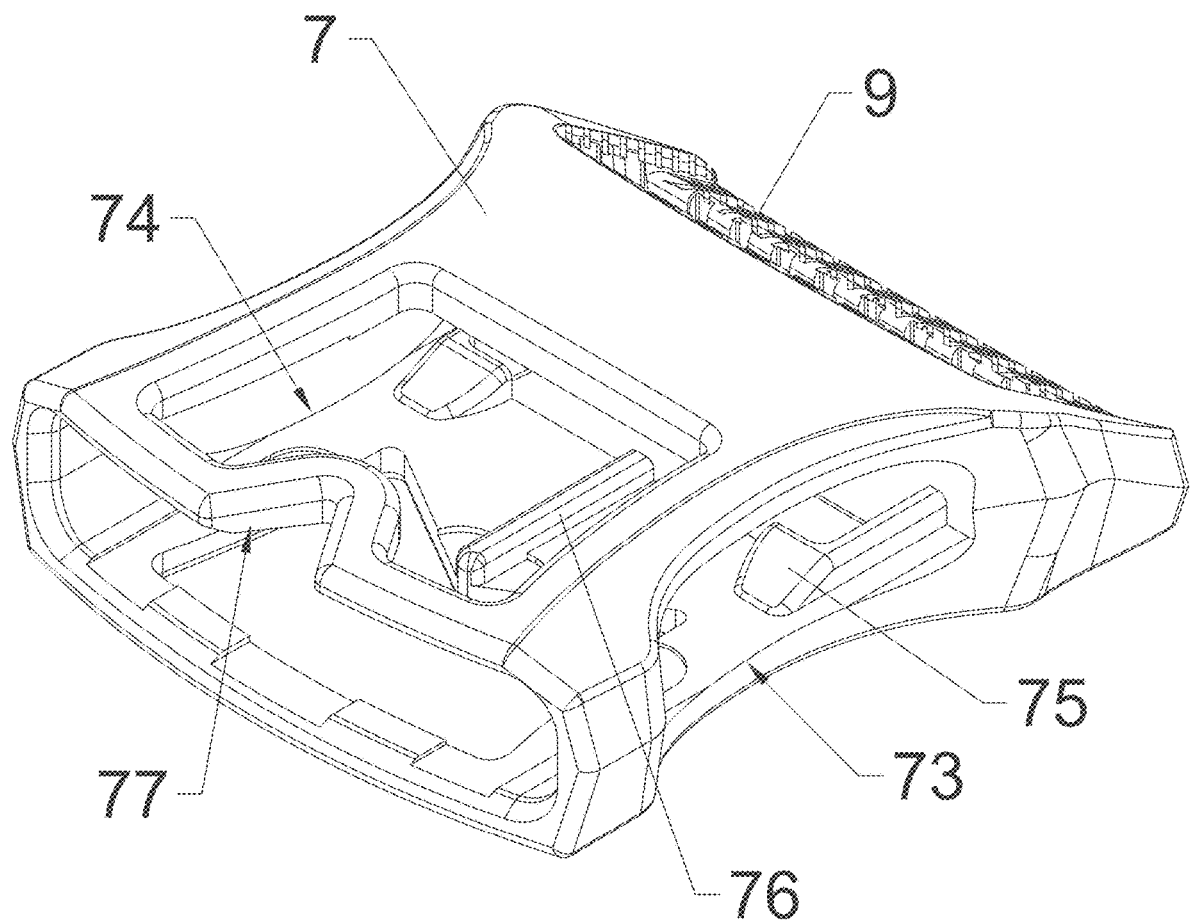
FIG. 6 is a perspective view of a female buckle portion in an exemplary embodiment of the present invention.
Figure 7:
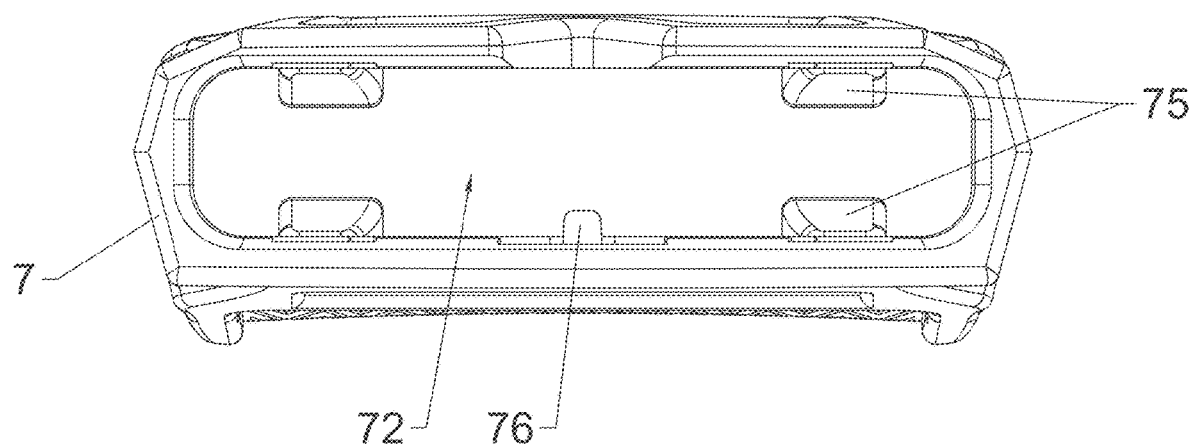
FIG. 7 is a front projection view of a female buckle portion according to an exemplary embodiment of the present invention.

In this embodiment, the male buckle portion 100 includes a male buckle portion body 1, a first trigger 2, a second trigger 3, and a resilient member 4. As shown in FIGS. 1-4, the first through hole 11 and the second through hole 12 are provided on the male buckle portion body 1, the lower end of the male buckle portion body 1 is provided with a mount 13 integrally formed with the male buckle portion body 1; the first trigger 2 and the second trigger 3 are provided on both sides of the mount 13, the first trigger 2 and the second trigger 3 are both pivotally connected to the male buckle portion body 1, the first trigger 2 and the second trigger 3 are both provided with a first tab 21 and a pressing portion 22; the resilient member 4 is connected to the mount 13, and the resilient member 4 is configured to urge the first trigger 2 and the second trigger 3 to rotate outwardly. As shown in FIGS. 6 and 7, one end of the female buckle portion 7 is provided with a cavity 72, one side of the female buckle portion 7 is provided with a first through-hole 73 in communication with the cavity 72, the other side of the female buckle portion 7 is provided with a second through-hole 74 in communication with the cavity 72, the first trigger 2 and the second trigger 3 may be simultaneously inserted into the cavity 72, the pressing portion 22 on the first trigger 2 may extend through the first through-hole 73 to the outside of the female buckle portion 7, the pressing portion 22 on the second trigger 3 may extend through the second through-hole 74 to the outside of the female buckle portion 7, the stopper 75 is provided with a stopper 75 in the cavity 72, and the stopper 75 and the first convex block 21 fasten to each other. When the pressing part 22 on the first and second triggers 2 and 3 is pressed inward, the first and second triggers 2 and 3 rotate inward and the stop 75 is separated from the first convex block 21.

Figure 5:
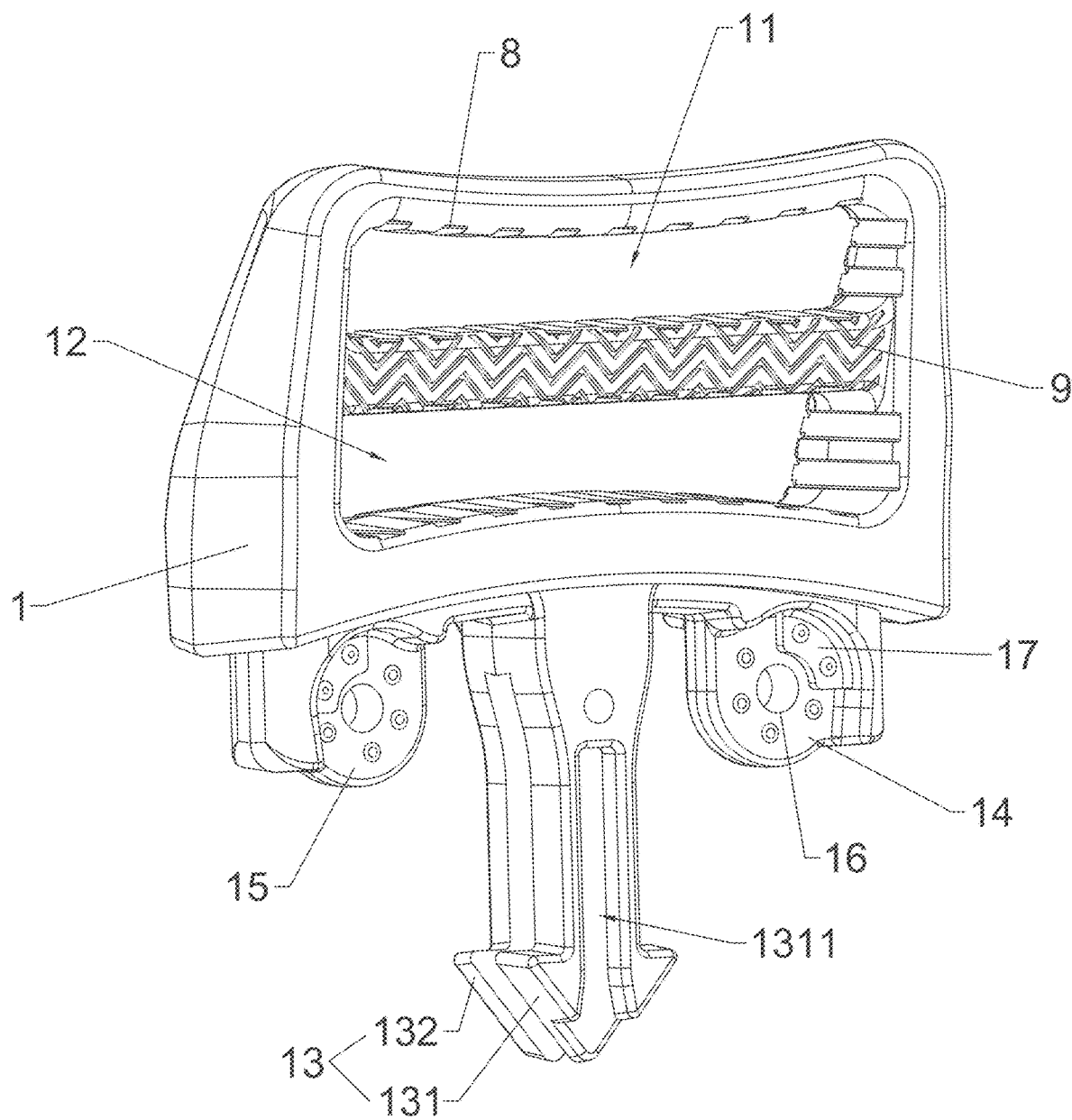
FIG. 5 is a block diagram of a male buckle portion body in an exemplary embodiment of the present invention.
Figure 8:
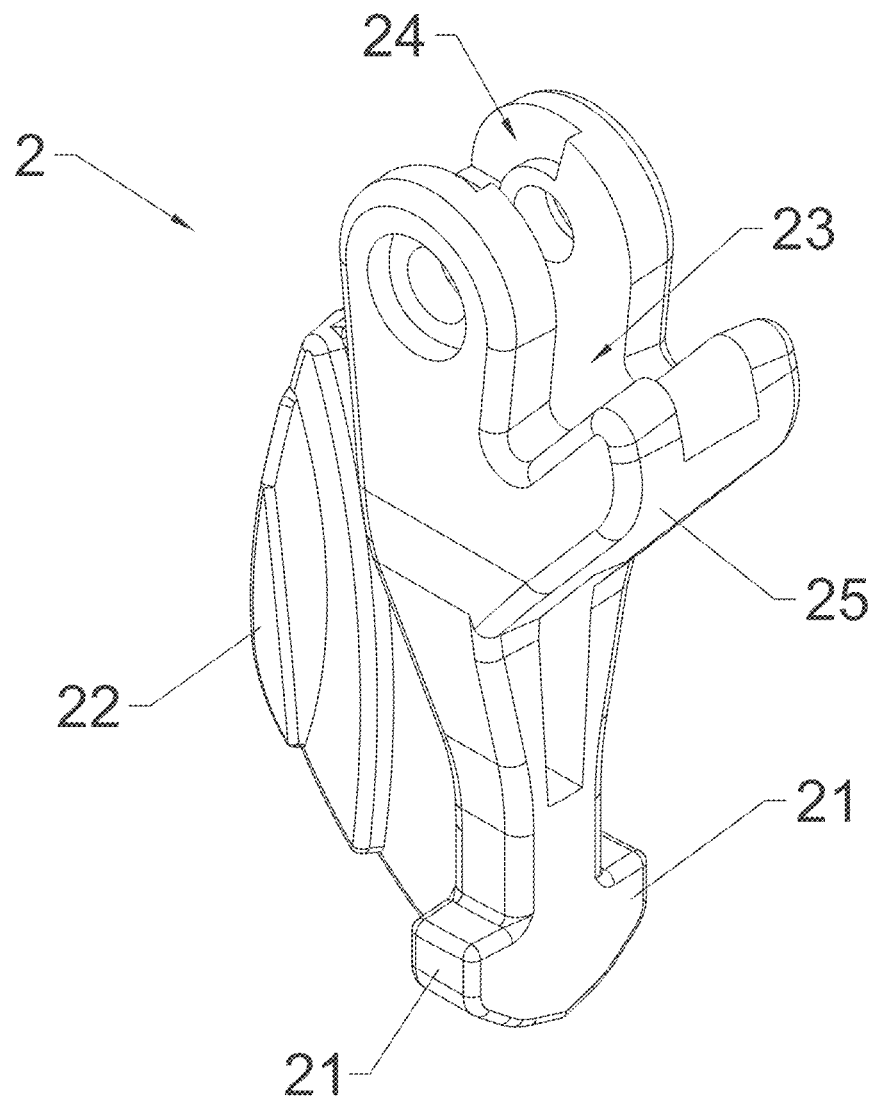
FIG. 8 is a perspective view of a first trigger in an exemplary embodiment of the present invention.

In a specific implementation, one side of the mount 13 is provided with a first hinge seat 14 integrally formed with the male buckle portion body 1, the other side of the mount 13 is provided with a second hinge mount 15 integrally formed with the male buckle portion body 1, and the first and second hinge seats 14, 15 are mirror symmetric about the mount 13. Where the first hinge mount 14 is provided with a pin hole 16 and a second convex block 17 located outside the pin hole 16, the first trigger 2 is provided with a range limiting slot 24 on the outside of the pin hole 16, the first trigger 2 is pivotally connected to the first hinge mount 14 by a pivot 6, and the second convex block 17 fastens into the range limiting slot 24 to limit the angle of rotation of the first trigger 2. Referring to FIGS. 5 and 8, the second convex block 17 and the thread slot 24 are each a fan ring, wherein the degree of the angle of the center of the thread slot 24 is greater than the degree of the angle of the circle of the second convex block 17. The second trigger 3 is mounted in the same manner as the first trigger 2.

Figure 15:
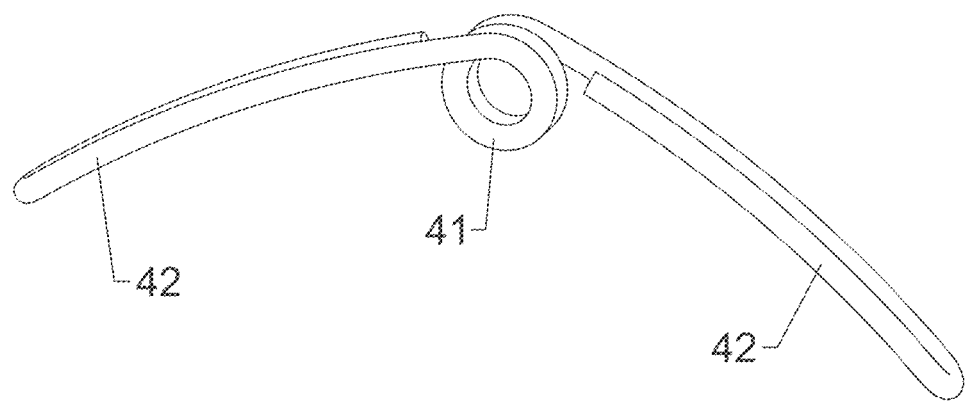
FIG. 15 is a perspective view of a resilient member in accordance with an exemplary embodiment of the present invention.

The resilient member 4 described above may employ an outer arm torsion spring as shown in FIG. 15, the coil 41 of the torsion spring pivotally connected to the mount 13, and the two outer arms 42 of the torsion spring abutting the first trigger 2 and the second trigger 3, respectively. As shown in FIG. 8, both the first trigger 2 and the second trigger 3 are provided with a receiving slot 23 adapted to receive the outer arm 42, and the outer arm 42 of the torsion spring extends into the receiving slot 23 and the outer arm 42 contacts the first trigger 2 away from one end of the coil 41. In the preferred embodiment, the first trigger 2 has two shielding part sections 25 on the first trigger 2, and two of the shielding part 25 on the first trigger 2 are located on both sides of the outer arm 42, respectively, and the passing shielding part section 25 can prevent inadvertent hitting torsion springs during use. The second trigger 3 is shaped and mounted the same as the first trigger 2.

Figure 4:
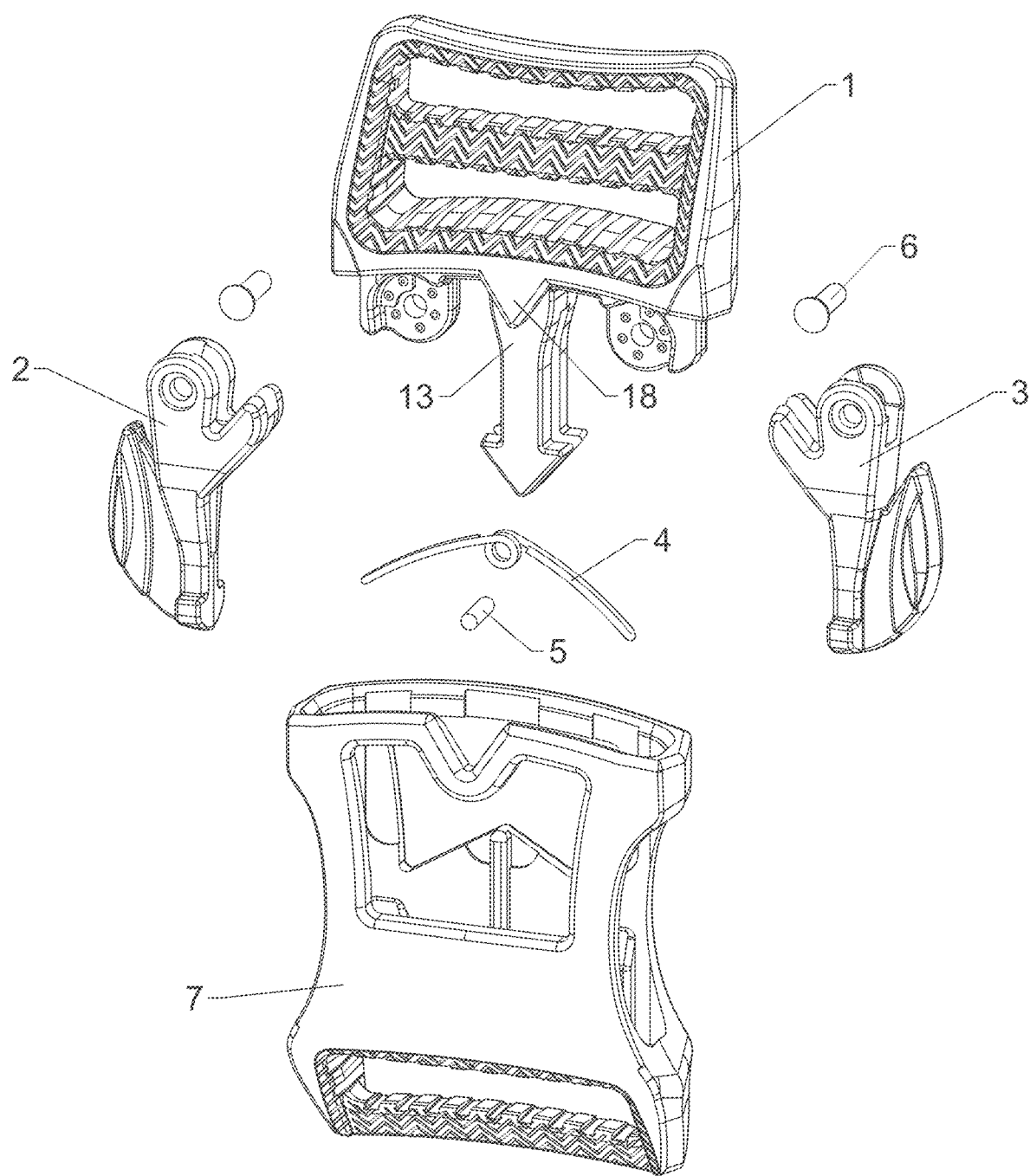
FIG. 4 is an exploded view depicting an exemplary embodiment of the present invention.

Referring to FIGS. 4 and 5, the mount 13 includes a first guide part 131 and a second guide part 132, the first guide part 131 and the second guide part 132 may be inserted into the cavity 72, the spring coil 41 of the torsion spring is disposed between the first guide part 131 and the second guide part 132, the spring coil 41 of the torsion spring is provided with a pin 5, and the pin 5 is fixedly coupled to the first guide part 131. The first guide part 131 is provided with a guide slot 1311 in a plane perpendicular to the direction of the buckle thickness, the direction of extension of the guide slot 1311 is aligned with the insertion direction of the buckle, the guide block 76 is provided in the cavity 72 in fixed connection with the female buckle portion 7, and the guide block 76 is insertable into the guide slot 1311. During the engagement of the male buckle portion 100 with the female buckle portion 7, the guide block 76 and the guide slot 1311 may act as guides to facilitate the insertion of the male buckle portion 100 into the female buckle portion 7. Further, after the male buckle portion 100 and the female buckle portion 7 fasten together, the guide block 76 and the guide slot 1311 may also prevent the male buckle portion 100 or the female buckle portion 7 from sloshing.

In the preferred embodiment, one end of the female buckle portion 7 is provided with a triangular notch 77, the male buckle portion body 1 is provided with a triangular stop block 18, the stop block 18 is insertable into the notch 77, and the stop block 18 cooperates with the notch 77 to improve the tightness of the male buckle portion 100 in engagement with the female buckle portion 7, preventing the female buckle portion 7 from sloshing relative to the male buckle portion 100. To reduce the overall weight of the buckle and reduce the amount of material used, a third through hole 78 in communication with the cavity 72 may be provided on the front face of the female buckle portion 7, a fourth through hole 79 in communication with the cavity 72 on the rear end face of the female buckle portion 7, and a fifth through hole 710.

EXAMPLE 2

Figure 14:
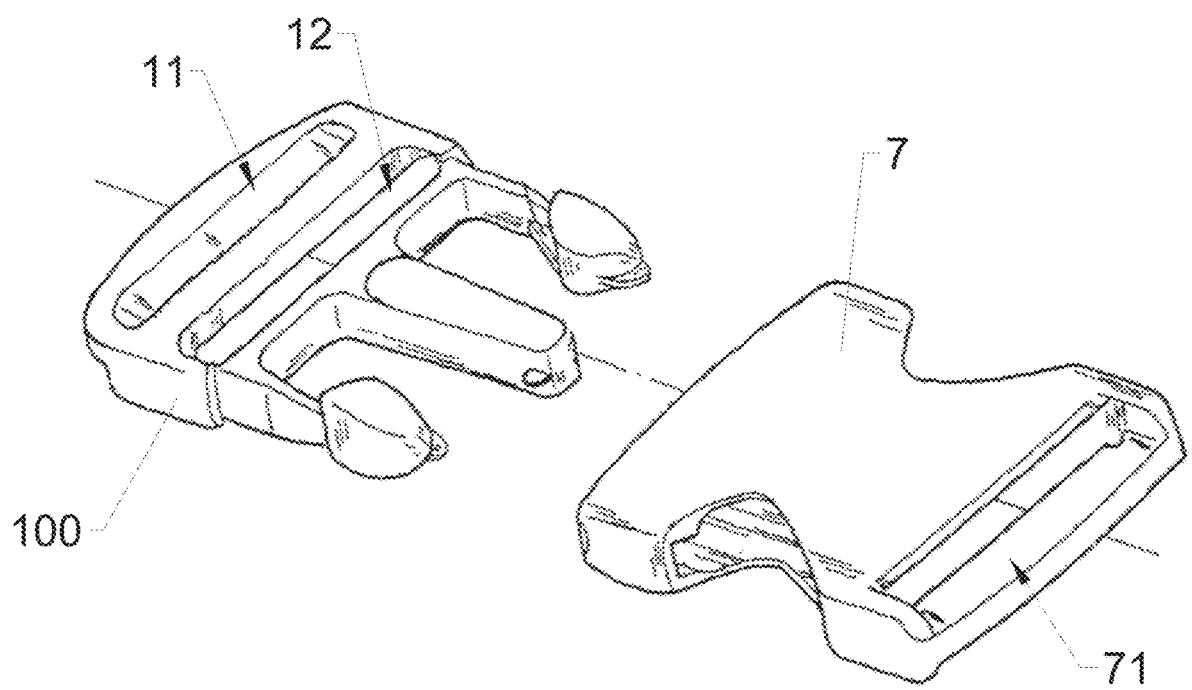
FIG. 14 is a buckle structure of the prior art.

Referring to FIG. 14, there is shown a buckle structure commonly found in the prior art, the buckle comprising a male buckle portion 100 and a female buckle portion 7 engaged with the male buckle portion 100, wherein the male buckle portion 100 is provided with a tongue for docking with the female buckle portion 7, and the male buckle portion 100 is provided with a first through hole 11 and a second through hole 12 on which the third through hole 71 is provided. The buckle 100 provided in the embodiment 2 of the present embodiments differs from the buckle shown in FIG. 14 in that the plurality of anti-skid edges 8 on the male buckle portion 100 of the embodiment 2 are distributed on the inside wall of the first through hole 11, the second through hole 12; the surface of the male buckle portion 100 is provided with a anti-skid stripes 9, the anti-skid stripes 9 on the male buckle portion 100 is distributed around the end of the first through hole 11, the second through hole 12; the plurality of anti-skid edges 8 are also provided on the female buckle portion 7, the plurality of anti-skid edges 8 on the female buckle portion 7 are spaced apart on the inside wall of the third through hole 71; the surface of the female buckle portion 7 is provided with a anti-skid stripes 9, and the anti-skid stripes 9 on the female buckle portion 7 is distributed around the end of the third through hole 71. The distribution positions of the anti-skid edges 8 and the anti-skid stripes 9 in this embodiment can be seen in the drawings of Example 1.

The illustrations of embodiments of the invention described herein are intended to provide a general understanding of the various embodiments, and they are not intended to serve as a complete description of all the elements and features of apparatus and systems that might make use of the circuits and techniques described herein. Many other embodiments will become apparent to those skilled in the art given the teachings herein; other embodiments are utilized and derived therefrom, such that structural and logical substitutions and changes can be made without departing from the scope of this disclosure. The drawings are also merely representational and are not drawn to scale. Accordingly, the specification and drawings are to be regarded in an illustrative rather than a restrictive sense.

The corresponding structures, materials, acts, and equivalents of all means or step-plus-function elements in the claims below are intended to include any structure, material, or act for performing the function in combination with other claimed elements as specifically claimed. The description of the various embodiments has been presented for purposes of illustration and description, but is not intended to be exhaustive or limited to the forms disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the various embodiments with various modifications as are suited to the particular use contemplated.

The abstract is provided to comply with 37 C.F.R. § 1.72 (b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the appended claims reflect, inventive subject matter lies in less than all features of a single embodiment. Thus the following claims are hereby incorporated into the Detailed Description, with each claim standing on its own as separately claimed subject matter.

The foregoing descriptions merely refer to the specific embodiments of the present disclosure, but the protection scope of the present disclosure is not limited thereto. Variations or modifications that can be made easily by those skilled in the art should fall within the protection scope of the present disclosure. Therefore, the protection scope of the present disclosure shall be subject to the protection scope of the claims.

What is claimed is:
1. A buckle, comprising:
a male buckle portion and a female buckle portion for docking with the male buckle portion, the male buckle portion having a first through hole and a second through hole thereon for webbing to pass therethrough, the female buckle portion having a third through hole for webbing to pass therethrough, wherein,
the male buckle portion is provided with a plurality of anti-skid edges thereon, which are spaced apart on an inner wall of the first through hole and the second through hole; the male buckle portion is provided with anti-skid stripes, which are distributed around an end of the first through hole and an end of the second through hole.

2. The buckle according to claim 1, wherein said female buckle portion is also provided with a plurality of anti-skid edges, which are spaced apart on an inner wall of said third through hole; said female buckle portion is provided with anti-skid stripes, which are distributed around an end of said third through hole.

3. The buckle according to claim 2, wherein an extension direction of the anti-skid edges is consistent with the thickness direction of the buckle, and a gap exists between the anti-skid edges adjacent to each other.

4. The buckle according to claim 3, wherein said anti-skid edges include, along their extending direction, a first end, an anti-skid part, and a second end in turn; the thickness of said anti-skid edges gradually increases from said first end to said anti-skid part; and the thickness of said anti-skid edges decreases gradually from said anti-skid part to said second end.

5. The buckle according to claim 2, wherein said anti-skid stripes strips include a plurality of wave-shaped slots spaced apart extending in a wave shape along a width direction of the buckle.

6. The buckle according to claim 1, the male buckle portion further comprising:
   a male buckle portion body, on which the first through hole and the second through hole are provided with, one end of the male buckle portion body being provided with a mounting seat;
   a first trigger and a second trigger, the first trigger and the second trigger being provided on both sides of the mounting seat, the first trigger and the second trigger being both pivotally connected to the male buckle portion body, the first trigger and the second trigger being provided with a first convex block and a pressing portion thereon;
   a resilient member, which is coupled to said mounting seat, said resilient member suitable for urging said first trigger and said second trigger to rotate outwardly;
   one end of the female buckle portion is provided with a cavity, one side of the female buckle portion is provided with a first through hole in communication with the cavity, the other side of the female buckle portion is provided with a second through hole in communication with the cavity, the first trigger and the second trigger may be simultaneously inserted into the cavity, the pressing portion on the first trigger may extend through the first through hole to the outside of the female buckle portion, the pressing portion on the second trigger may extend through the second through hole to the outside of the female buckle portion, the cavity is provided with a stop block, where the stop block and the first convex block fasten to each other, and the stop block may be separated from the first convex block when the pressing portion is pressed inward.

7. The buckle according to claim 6, wherein the resilient member is a torsion spring, where a coil of the torsion spring pivotally connected to the mounting seat, and two outer arms of the torsion spring abutting the first trigger and the second trigger respectively.

8. The buckle according to claim 7, wherein said mounting seat includes a first guide part and a second guide part, where said first guide part and said second guide part are insertable into said cavity.

9. The buckle according to claim 8, wherein the first guide part is provided with a guide slot in a surface perpendicular to the buckle thickness direction, the guide slot extends in a direction consistent with the direction of buckle penetration, the cavity is provided with a guide block fixedly attached to the female buckle portion, and the guide block is insertable into the guide slot.

10. The buckle of claim 6, wherein, one end of the female buckle portion is provided with a notch, on which a stop block is provided, where the stop block is insertable into the notch.

11. A pet restraint device, comprising:
   a webbing, and;
   the buckle of claim 1.

* * * * *